(12) United States Patent  
Neder et al.

(10) Patent No.: US 7,073,948 B2
(45) Date of Patent: Jul. 11, 2006

(54) ROLLER BEARING

(75) Inventors: Gunter Neder, Schweinfurt (DE); Rut Heemskerk, Poppenhausen-Kutzberg (DE); Bruno Schemmel, Geldersheim (DE); Jurgen Reichert, Donnersdorf (DE); Robert Grull, Sulzdorf a. d. Lederhecke (DE); Burkard Beck, Unterpleichfeld (DE); Alfred Schwappach, Bundorf (DE); Stefan Wagner, Schweinfurt (DE)

(73) Assignee: AB SKF, Gothenburg (SE)

( * ) Notice: Subject to any disclaimer, the term of this patent is extended or adjusted under 35 U.S.C. 154(b) by 40 days.

(21) Appl. No.: 10/902,377

(22) Filed: Jul. 30, 2004

(65) Prior Publication Data

US 2005/0058383 A1    Mar. 17, 2005

(30) Foreign Application Priority Data

Aug. 2, 2003    (DE)    ................................. 103 35 415

(51) Int. Cl.
*F16C 19/40*    (2006.01)
(52) U.S. Cl. ...................................... 384/447; 384/551
(58) Field of Classification Search ................. 384/47, 384/447, 551, 572
See application file for complete search history.

(56) References Cited

U.S. PATENT DOCUMENTS

| 2,628,137 | A |   | 2/1953  | Ashton |
|-----------|---|---|---------|--------|
| 2,734,786 | A |   | 2/1956  | McNicoll |
| 4,479,683 | A | * | 10/1984 | Kanamaru .................. 384/619 |
| 4,687,345 | A | * | 8/1987  | Geka ........................... 384/47 |
| 4,915,513 | A | * | 4/1990  | Orain .......................... 384/447 |

FOREIGN PATENT DOCUMENTS

| DE | 859699      | 12/1952 |
| DE | 3709039 C2  | 10/1988 |
| JP | 58-155423   | 10/1983 |
| JP | 2000-181364 | 6/2000  |

* cited by examiner

*Primary Examiner*—Thomas R. Hannon
(74) *Attorney, Agent, or Firm*—Buchanan Ingersoll

(57) ABSTRACT

A roller bearing (e.g., a cross taper roller bearing) includes an outer ring, an inner ring and rolling elements (e.g., taper rollers) located between the inner and outer rings. The rolling elements are kept at a distance by a cage formed from a number of individual cage segments. Each cage segment has two opposing guide sections for one of the rolling elements to at least partially encompass the rolling element on both sides. In addition, for the rolling elements bordering the one rolling element, the cage segment has guide sections which, in interaction with a corresponding guide section of an adjacent cage segment, at least partially encompass the bordering rolling elements.

20 Claims, 3 Drawing Sheets

ROLLER BEARING

This application is based on and claims priority under 35 U.S.C. § 119 with respect to German Application No. 103 35 415.8 filed on Aug. 2, 2003, the entire content of which is incorporated herein by reference.

FIELD OF THE INVENTION

The invention generally relates to a bearing. More particularly, the invention pertains to a roller bearing or antifriction bearing having inner and outer rings and rolling elements located between the rings, with the rolling elements being kept at a distance by a cage and the cage being formed from a number of individual cage segments.

BACKGROUND DISCUSSION

Antifriction bearings or roller bearings provided with a cage assembled from segments are known. DE-PS 859 699 discloses a cross cylindrical roller bearing in which two succeeding cylindrical rollers are each turned by 90° to one another. The cage here consists of individual segments which are connected to one another and which form the entire cage structure.

DE 37 09 039 C2 discloses a cage for lengthwise movements in which individual cage segments are located behind one another.

For certain bearing applications, for example in heavy machinery construction, cross taper roller bearings are required. In these, two taper rollers follow one another in the peripheral direction of the bearing, each turned by 90°.

Here, it has been found to be problematical to make the cage such that the individual taper rollers are held at the desired distance to one another and, even when they do not need to transfer a load, are kept in their starting position. The diameter of the taper rollers for this type of bearings is always greater than the length of the taper roller. This means that taper rollers in a bearing provided with bearing play, but also in a preloaded bearing in which the deformation under load is greater than the preloading, have play while being loaded. These taper rollers then drop down due to their own weight until they contact the respective track. Upon repeated loading, these rollers must first again reach their starting edge on the ring; but this takes place only after a few revolutions of the bearing. This means that the taper rollers are briefly loaded in a nonuniform manner; which can quickly lead to overloading of the bearing.

Increasing the preloading of the bearing to prevent the indicated effect is not an effective solution because highly preloaded bearings have increased friction and consequently heat up more quickly. The service life of the bearing is thus reduced. Correspondingly highly preloaded cross taper roller bearings are therefore used mainly only for swivelling motions.

SUMMARY

A roller bearing in the form of a cross taper roller bearing comprises an outer ring, an inner ring, a plurality of taper rollers located between the inner and outer rings, and a cage for maintaining the taper rollers at a distance to one another. The cage is comprised of a plurality of individual cage segments, each comprising two opposing guide sections between which is positioned a first one of the taper rollers, with the two opposing guide sections at least partially encompassing the first taper roller on opposite sides. Each cage segment also comprises a first additional guide section which interacts with a corresponding guide section of an adjacent cage segment to at least partially encompass a second one of the taper rollers bordering the first taper roller, and a second additional guide section which interacts with a corresponding guide section of another adjacent cage segment to at least partially encompass a third one of the taper rollers bordering the first taper roller.

This configuration of a cage segment results in that the cage which has been formed by these segments is characterized in that under all load conditions the taper rollers cannot drop out of their optimum starting position so that running of the bearing is optimized. With the bearing made as a cross taper roller bearing, the taper rollers, even without providing high preloading of the bearing, are generally always held in their relatively ideal starting position. Unloaded rollers are inhibited or prevented from dropping out of their starting position. The bearing can be made with bearing play, and a relatively high bearing rpm is possible. In addition, relatively simple installation of the bearing is made possible. Additionally, by achieving relatively uniform load-bearing capacity, even with loading on alternating sides, the service life of the bearing is kept relatively long.

The two opposing guide sections of the cage segment can be connected to one another by a bottom which forms the contact surface for the front end of the taper roller. Also, each cage segment in the area of the guide sections can have two crosspieces which extend in the peripheral direction of the bearing and which form a contact surface for the front end of the taper rollers. Here it is possible for the crosspieces of two adjacent cage segments to form a common contact surface for the front end of the taper rollers. It is preferable that the width (thickness) of the bottom and/or of the crosspieces is slightly smaller than the difference between the greatest diameter of the taper roller and the length of the taper roller. The bottom and/or the crosspiece is also preferably located in the area of the smaller diameter of the taper roller.

It is preferable that the cage, specifically the individual case segments, are made of plastic. This enables an especially efficient and economical manner of production by injection molding.

According to another aspect; a roller bearing comprises an outer ring, an inner ring, a plurality of rolling elements positioned between the inner and outer rings, and a cage for maintaining the rolling elements at a distance to one another. The cage is comprised of a plurality of individual cage segments including a first cage segment, and second and third cage segments positioned on opposite sides of the first cage segment. The first cage segment comprises first, second, third and fourth guide sections, with the first and second guide sections facing each other and a first one of the rolling elements positioned between the first and second guide sections to at least partially encompass the first rolling element. The third guide section faces away from the first rolling element and cooperates with a guide section of the second cage segment to at least partially surround a second one of the rolling elements positioned between the third guide section and the guide section of the second cage segment. The fourth guide section faces away from the first rolling element and cooperates with a guide section of the third cage segment to at least partially surround a third one of the rolling elements positioned between the fourth guide section and the guide section of the third cage segment.

BRIEF DESCRIPTION OF THE DRAWING FIGURES

The foregoing and additional features of the present invention will become more apparent from the following detailed description considered with reference to the accompanying drawing figures in which like elements are designated by like reference numerals.

DETAILED DESCRIPTION

Figure 1:
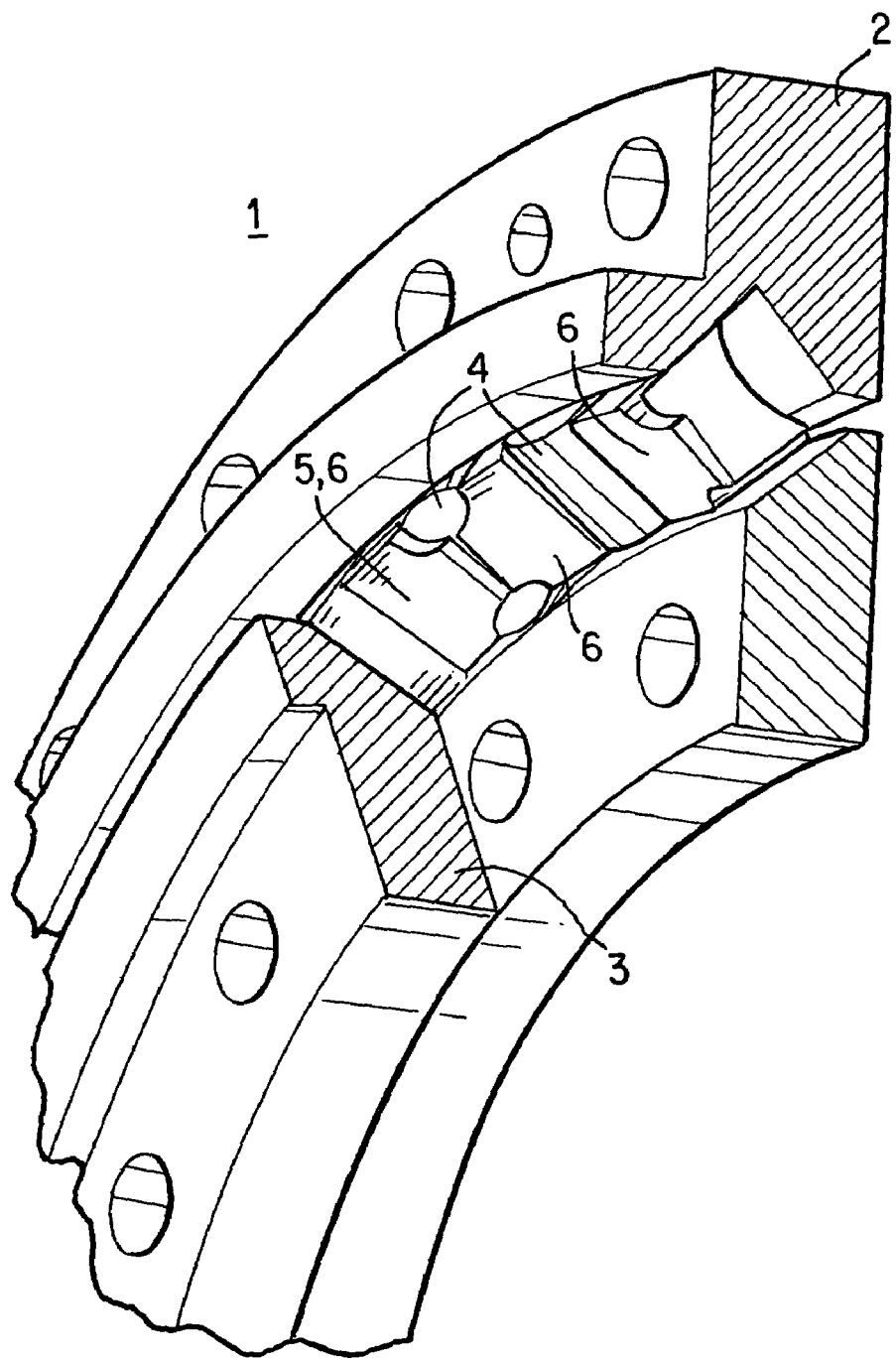
FIG. 1 is a perspective view of a portion of a cross taper roller bearing according to an embodiment of the present invention.

Referring to FIG. 1, a cross taper roller bearing 1 comprises an outer ring 2 and an inner ring 3. A plurality of rolling bodies in the form of taper rollers 4 are located between the outer ring 2 and the inner ring 3. The bearing 1 is made as a cross taper roller bearing; meaning that for each two taper rollers 4 which follow one another in the peripheral direction, the two taper rollers 4 are turned by 90° to one another.

Figure 2:
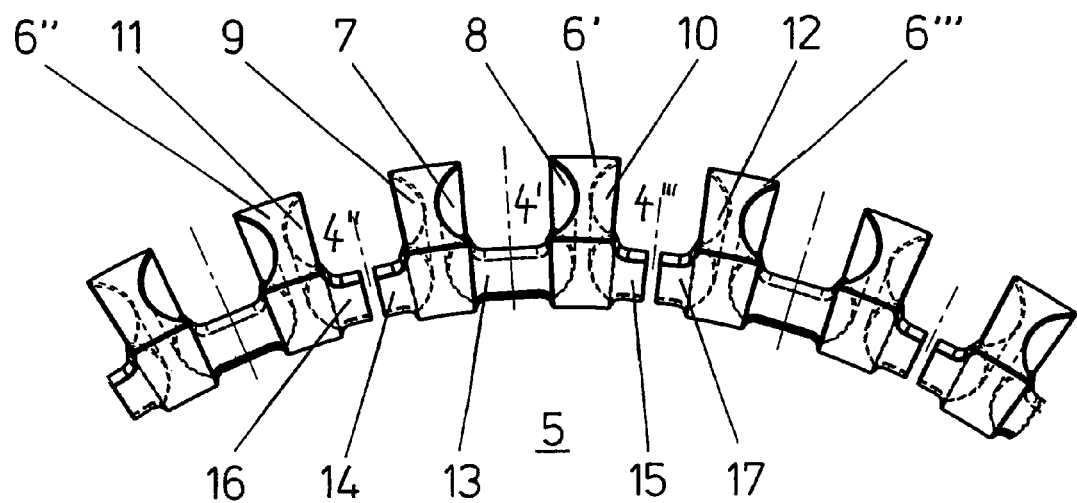
FIG. 2 is a side view of four individual segments of the cage of the cross taper roller bearing, which segments follow one another in the peripheral direction.
Figure 3:
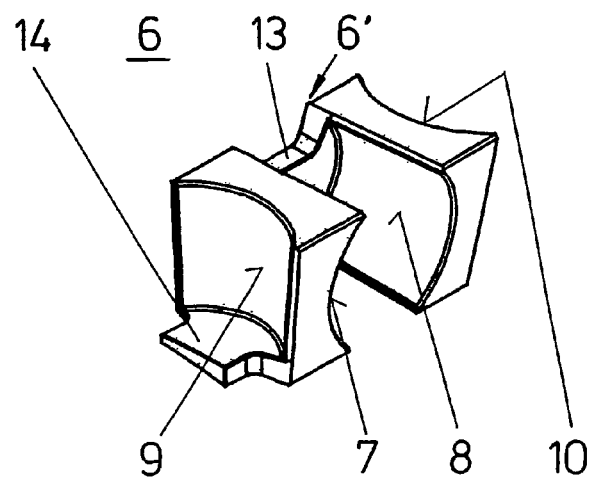
FIG. 3 is a perspective view of one of the individual cage segments forming the cage of the cross taper roller bearing.
Figure 4:
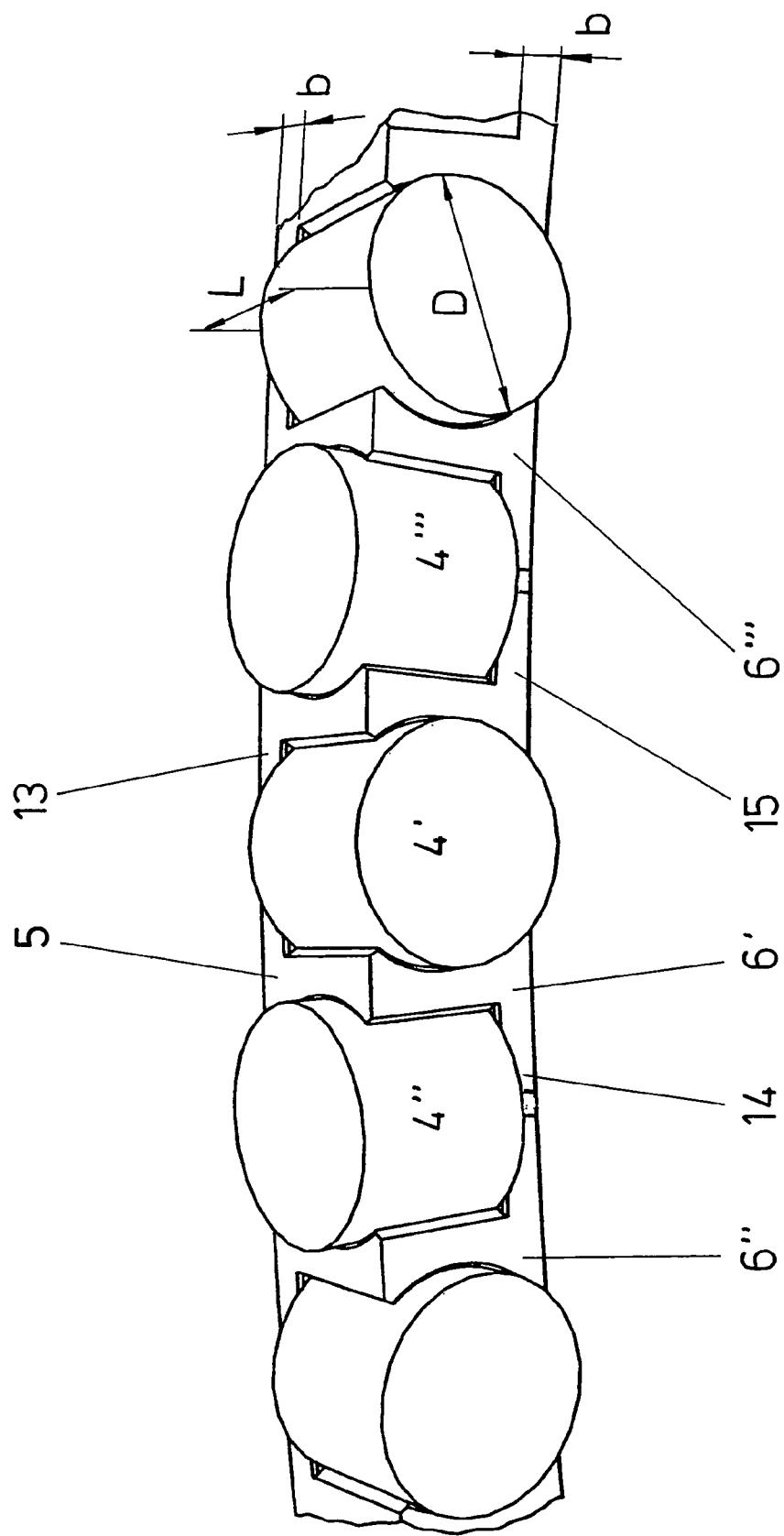
FIG. 4 is a perspective view of a part of the cage of the cross taper roller bearing with the taper rollers inserted.

The guiding of the individual taper rollers 4 is accomplished by a cage 5 which is comprised of individual cage segments 6. The cage segments 6 may be made of plastic. FIGS. 2–4 show the structure of the individual cage segments 6, 6', 6", 6'".

Each cage segment 6, 6', 6", 6'" has two opposing guide sections 7, 8 for receiving one taper roller 4. FIG. 4 illustrates several of the taper rollers 4', 4" 4'" which possess a slightly tapered configuration. As is especially clearly shown in FIG. 3, the guide sections 7, 8 are adapted to generally encompass one taper roller on both sides (on diametrically opposite sides). That is, the guide sections 7, 8 are each adapted to encompass one of the taper rollers over a peripheral area of roughly 90°. The taper roller is thus partially encompassed or surrounded by the two guide sections 7, 8.

Furthermore, each cage segment 6, 6', 6", 6'" for the taper rollers 4", 4'" bordering the taper roller 4' which is encompassed on both sides has one guide section 9, 10 at a time which, in interaction with the corresponding guide section 11, 12 of the cage segments 6", 6'" bordering the cage segment 6', in turn encompasses the taper rollers 4", 4'" as shown in FIG. 2. Thus, each cage segment has a pair of guide sections (i.e., guide sections 7, 8) which encompass a first one of the taper rollers (i.e., taper roller 4'), another guide section (e.g., guide section 9) which interacts with a guide section (e.g., guide section 11) on a bordering cage segment (e.g., cage segment 6") to encompass a second taper roller (e.g., taper roller 4") positioned on one side of the first taper roller 4', and a further guide section (e.g., guide section 10) which interacts with a guide section (e.g., guide section 12) on a bordering cage segment (e.g., cage segment 6'") to encompass a third taper roller (e.g., taper roller 4'") positioned on an opposite side of the first taper roller 4'.

The connection of the two guide sections 7, 8 of the cage segment 6' is accomplished by a bottom 13. The width or thickness b of the bottom is slightly smaller than the difference between the largest diameter D of the taper roller 4 and the length L of the taper roller. This thus helps to ensure that the taper roller 4 is kept in its relatively optimum starting position under all loading circumstances.

With respect to the width b of the crosspieces 14, 15, 16, 17, the analogous applies. That is, the width or thickness b of the crosspieces is also slightly smaller than the difference between the largest diameter D and the length L of the taper roller 4.

This configuration helps ensure that a taper roller is held enclosed on both sides by a cage segment. The taper rollers following on both sides are each enclosed by one cage segment only on one side. The roller pockets formed by the guide sections are thus open on one side. In the area of the small diameter of the taper roller enclosed on both sides is the bottom which holds the taper roller. For the taper roller which is enclosed by the cage segment on only one side, there is a crosspiece which in interaction with the crosspiece of the bordering cage segment accomplishes relatively reliable guiding of the taper roller, with the crosspieces being located in the area of smaller or smallest diameter of the taper rollers.

Advantageously, when the bearing is being mounted, the taper roller is held in its relatively optimum starting position. In operation, longer rolling of the bearing until the taper roller adjoins the corresponding retaining edge of the ring is not necessary. Furthermore it is advantageous that the proposed cage structure precludes the taper rollers from being mounted in the wrong position.

The length of the crosspieces of the individual cage segments measured in the peripheral direction of the bearing is chosen such that even with maximum end play of the cage segments and maximum changes of the dimensions of the individual parts of the bearing due to heating, the taper rollers always rest on the crosspieces and consequently remain exactly positioned.

The principles, preferred embodiment and mode of operation have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A cross taper roller bearing comprising:
   an outer ring;
   an inner ring;
   a plurality of taper rollers located between the inner and outer rings;
   a cage for maintaining the taper rollers at a distance to one another;
   the cage being comprised of a plurality of individual cage segments;
   each cage segment comprising two opposing guide sections between which is positioned a first one of the taper rollers, the two opposing guide sections at least partially encompassing the first taper roller on opposite sides; and
   each cage segment also comprising a first additional guide section which interacts with a corresponding guide section of an adjacent cage segment to at least partially encompass a second one of the taper rollers bordering the first taper roller, and a second additional guide section which interacts with a corresponding guide section of another adjacent cage segment to at least partially encompass a third one of the taper rollers bordering the first taper roller.

2. The cross taper roller bearing according to claim 1, wherein the two opposing guide sections of the cage segment are connected to one another by a bottom which forms a contact surface for a front end of the first taper roller.

3. The cross taper roller bearing according to claim 2, wherein each cage segment in an area of the first and second additional guide sections has two crosspieces extending in a peripheral direction of the bearing and forming a contact surface for a front end of the second and third taper rollers.

4. The cross taper roller bearing according to claim 3, wherein the crosspieces of two adjacent cage segments form a common contact surface for the front end of the second and third taper rollers.

5. The cross taper roller bearing according to claim 4, wherein the width and the thickness of the bottom and the crosspieces is smaller than a difference between a greater diameter of the taper rollers and a length of the taper rollers.

6. The cross taper roller bearing according to claim 5, wherein the bottom and the crosspieces are located in an area of a smaller diameter of the taper rollers.

7. The cross taper roller bearing according to claim 6, wherein each of the cage segments is made of plastic.

8. The cross taper roller bearing according to claim 3, wherein the width and the thickness of the crosspieces is smaller than a difference between a greater diameter of the taper rollers and a length of the taper rollers.

9. The cross taper roller bearing according to claim 3, wherein the crosspieces are located in an area of a smaller diameter of the taper rollers.

10. The cross taper roller bearing according to claim 2, wherein the width and the thickness of the bottom is smaller than a difference between a greater diameter of the taper rollers and a length of the taper rollers.

11. The cross taper roller bearing according to claim 2, wherein the bottom is located in an area of a smaller diameter of the taper rollers.

12. The cross taper roller bearing according to claim 1, wherein each cage segment in an area of the first and second additional guide sections has two crosspieces extending in a peripheral direction of the bearing and forming a contact surface for a front end of the second and third taper rollers.

13. A roller bearing comprising:
an outer ring;
an inner ring;
a plurality of rolling elements positioned between the inner and outer rings;
a cage for maintaining the rolling elements at a distance to one another;
the cage being comprised of a plurality of individual cage segments including a first cage segment, and second and third cage segments positioned on opposite sides of the first cage segment;
the first cage segment comprising first, second, third and fourth guide sections, the first and second guide sections facing each other with a first one of the rolling elements positioned between the first and second guide sections to at least partially encompass the first rolling element;
the third guide section facing away from the first rolling element and cooperating with a guide section of the second cage segment to at least partially surround a second one of the rolling elements positioned between the third guide section and the guide section of the second cage segment; and
the fourth guide section facing away from the first rolling element and cooperating with a guide section of the third cage segment to at least partially surround a third one of the rolling elements positioned between the fourth guide section and the guide section of the third cage segment.

14. The roller bearing according to claim 13, wherein the first and second guide sections are connected to one another by a bottom which is contacted by one end of the first rolling element.

15. The roller bearing according to claim 14, wherein the bottom possesses a width smaller than a difference between a diameter of the rolling elements and a length of the rolling elements.

16. The roller bearing according to claim 13, wherein the first cage segment in an area of the third and fourth guide sections has two crosspieces extending in a peripheral direction of the bearing and forming a surface contacted by an end of the second and third rolling elements.

17. The roller bearing according to claim 16, wherein the second cage segment has a crosspiece which, together with one of the crosspieces of the first cage segment, forms a common contact surface for the end of the second rolling element, and wherein the third cage segment has a crosspiece which, together with one of the crosspieces of the first cage segment, forms a common contact surface for the end of the third rolling element.

18. The roller bearing according to claim 16, wherein the crosspieces possess a width smaller than a difference between a diameter of the rolling elements rollers and a length of the rolling elements.

19. The roller bearing according to claim 13, wherein the rolling elements are taper rollers.

20. The roller bearing according to claim 13, wherein each of the cage segments is made of plastic.

* * * * *